United States Patent [19]

Wall

[11] Patent Number: 4,859,021
[45] Date of Patent: Aug. 22, 1989

[54] HERMETIC FEEDTHROUGH CONNECTOR FOR FIBER OPTIC TRANSMISSION

[75] Inventor: Stephen W. Wall, Costa Mesa, Calif.

[73] Assignee: Hughes Aircraft Company, Los Angeles, Calif.

[21] Appl. No.: 247,010

[22] Filed: Sep. 20, 1988

[51] Int. Cl.[4] .............................................. G02B 6/36
[52] U.S. Cl. .............................. 350/96.20; 350/96.18
[58] Field of Search ............... 350/96.15, 96.20, 96.18, 350/96.21, 96.22

[56] References Cited

U.S. PATENT DOCUMENTS

| | | | |
|---|---|---|---|
| 3,825,320 | 7/1974 | Redfern | 350/96.18 |
| 4,360,249 | 11/1982 | Slemon | 350/96.18 |
| 4,421,383 | 12/1983 | Carlsen | 350/96.21 |
| 4,469,399 | 9/1984 | Cowen et al. | 350/96.20 |
| 4,509,827 | 4/1985 | Cowen et al. | 350/320 |
| 4,545,643 | 10/1985 | Young et al. | 350/96.20 |
| 4,553,812 | 11/1985 | Kojiro et al. | 350/96.20 |
| 4,606,603 | 8/1986 | Cairns | 350/96.21 |
| 4,637,683 | 1/1987 | Asawa | 350/96.18 |
| 4,682,846 | 7/1987 | Cowen | 350/96.18 |
| 4,707,068 | 11/1987 | Moulin | 350/96.21 |
| 4,708,431 | 11/1987 | Pikulski et al. | 350/96.20 |
| 4,759,601 | 7/1988 | Knutsen et al. | 350/96.21 |
| 4,798,433 | 1/1989 | Irvin et al. | 350/96.21 |

Primary Examiner—Frank Gonzales
Attorney, Agent, or Firm—Joseph E. Szabo

[57] ABSTRACT

A feedthrough connector (11) comprising a connector body (17) having a passage (33) extending therethrough, a graded index rod (19) in the passage and an alignment sleeve (21) receiving portions of the graded index rod and having a section extending beyond the end (65) of the graded index rod for receiving a bushing (73) of a fiber optic terminus (75). The connector body includes end body sections (25, 27) and a central body section (23), with the end body sections being releasably attached to the central body section.

10 Claims, 2 Drawing Sheets

HERMETIC FEEDTHROUGH CONNECTOR FOR FIBER OPTIC TRANSMISSION

BACKGROUND OF THE INVENTION

1. Field of the Invention

This invention is related to a hermetically sealed feedthrough connector.

2. Description of Related Art

It is sometimes necessary or desirable to interconnect fiber optic termini through a bulkhead or mounting panel. This is accomplished with the use of a feedthrough connector which can be coupled to the bulkhead and to the fiber optic termini on the opposite sides of the bulkhead. The feedthrough connector must transmit an optical signal or image between the fiber optic termini and, in many cases, must be hermetically sealed.

One such feedthrough connector is shown and described in Maranto U.S. Pat. No. 4,822,130 issued on Apr. 18, 1989, and assigned to the assignee of the present invention. This feedthrough connector utilizes an optical fiber to transmit an optical signal between the fiber optic termini to which it is coupled and has the advantage of being usable with standard military specified fiber optic termini.

A feedthrough connector may employ a graded index rod in lieu of an optical fiber to transmit an optical signal or image between the fiber optic termini. One such construction is shown in Redfern U.S. Pat. No. 3,825,320. The use of a graded index rod in a feedthrough connector provides some advantages. However, the construction shown in the Redfern patent has the disadvantage that it cannot be used with the standard military specified fiber optic terminus.

SUMMARY OF THE INVENTION

This invention provides a fiber optic feedthrough connector which can be used with standard military specified fiber optic termini and has several features which adapt it for use with standard military specified fiber optic termini. The feedthrough connector of this invention also obtains the advantages of a graded index rod.

The invention can advantageously be embodied in a feedthrough connector which comprises a connector body, including first and second body sections and a central body section between the first and second body sections. The first and second body sections are releasably attached to the central body section, and the body sections have a passage extending therethrough. A graded index rod is mounted in the passage and has first and second ends in the portions of the passage which lie in the first and second body sections, respectively. An alignment sleeve in the first body section receives a portion of the graded index rod and has means extending beyond the end of the graded index rod for receiving an end portion of a fiber optic terminus.

With this construction, the alignment sleeve serves to assist in coupling the fiber optic terminus to the graded index rod. The alignment sleeve is preferably of the type commonly used in coupling the standard military specified fiber optic terminus, and thus, the alignment sleeve assists in adapting the feedthrough connector of this invention for use with the standard military specified fiber optic terminus and with a graded index rod.

To facilitate assembly and repair, both the first and second body sections are releasably coupled to the central section. With this construction, assembly of the graded index rod into the body sections along with the alignment sleeves is facilitated, and disassembly for purposes of repair is likewise made easier. Also, either or both of the first and second connector body sections may include an end segment and a main segment and means for releasably attaching the end segment to the main segment. With this construction, a portion of the alignment sleeve is in the end segment so that removal of the end segment exposes the alignment sleeve for removal and/or repair without full disassembly of the feedthrough connector.

In a preferred construction, at least the first body section has a wall defining an enlarged region of the passage in the first body section. The alignment sleeve is in the enlarged region of the passage and spaced radially inwardly of the wall over at least some of the length of the alignment sleeve. This allows ample room for the first body section to be assembled onto the central body section following assembly of the alignment sleeve onto the graded index rod.

The passage through the body opens at a port in the first body section. The feedthrough connector includes means for preventing the alignment sleeve in the first body section from being moved out of the passage through the port. Although such means can be of various different constructions, in a preferred construction it includes a flange which obstructs movement of the alignment sleeve out of the passage and through the port.

When mounted on a bulkhead, the central body section and the first body section are on one side of the bulkhead, and the second body section extends through an opening in the bulkhead to the other side of the bulkhead. Various means can be used to mount the body on the bulkhead, and in a preferred construction, such means includes a jam nut on the second body section and a flange on the central body section which clamp an annular region of the bulkhead to thereby mount the feedthrough connector on the bulkhead.

Seal means is provided, and preferably such seal means hermetically seals the feedthrough connector. For example, resilient seals can be provided between the flange on the connector body and the bulkhead and between the first connector body section and the central body section. In addition, a seal, such as solder or epoxy, may be provided to seal the interface between the graded index rod and the central body section and the interface between the bulkhead and the central body section.

The invention, together with additional features and advantages thereof, may best be understood by reference to the following description taken in connection with the accompanying illustrative drawing.

DESCRIPTION OF THE PREFERRED EMBODIMENT

Figure 1:
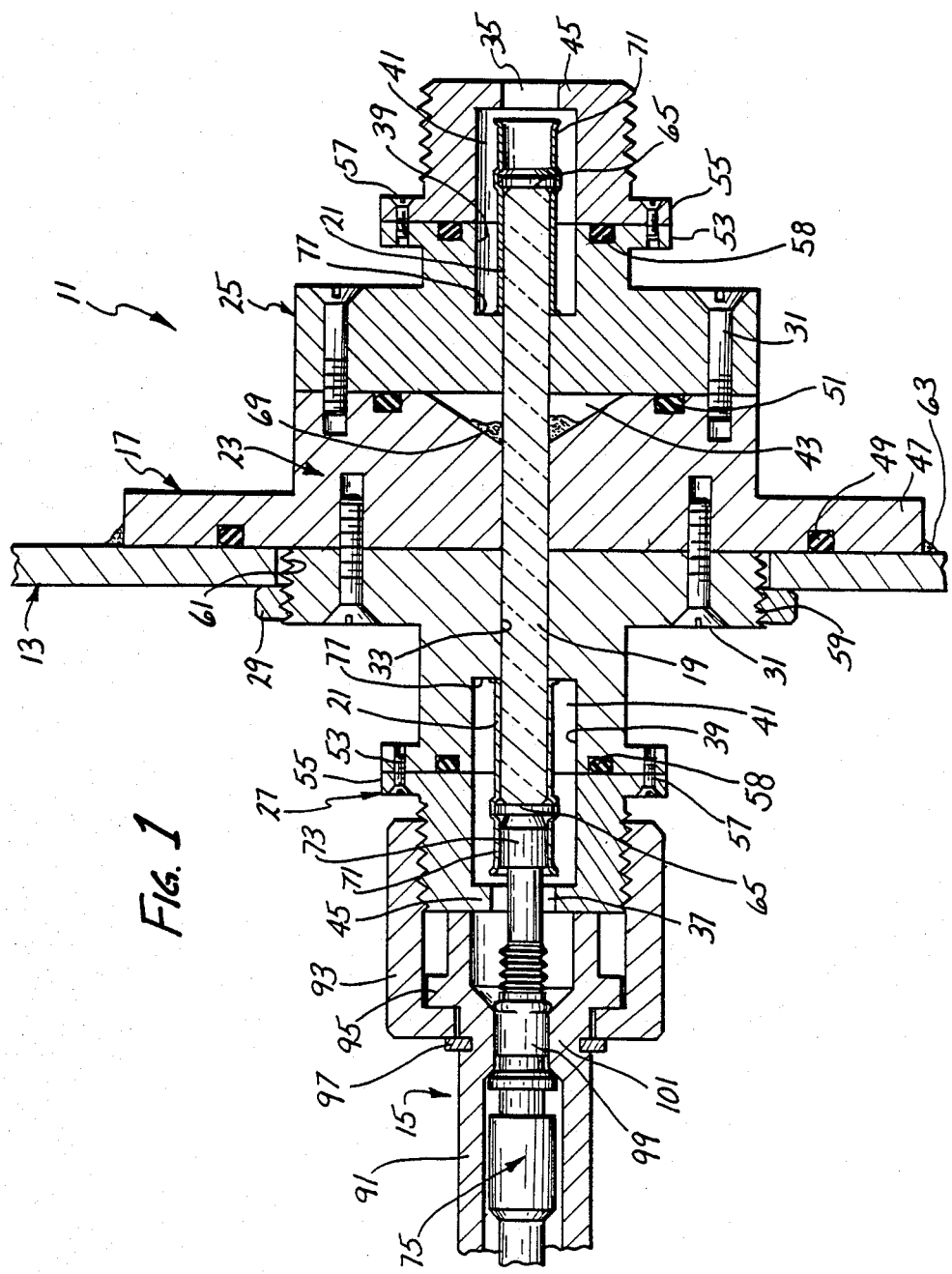
FIG. 1 is a sectional view taken on an axial plane through a bulkhead, a feedthrough connector constructed in accordance with the teachings of this invention and a portion of a fiber optic connector.

Referring now to the drawings in more detail, FIG. 1 shows a feedthrough connector 11 coupled to a bulkhead 13 and mechanically and optically coupled to a fiber optic connector 15. The feedthrough connector 11 comprises a body 17, a graded index rod 19 and alignment sleeves 21.

The body 17 comprises a central body section 23, an end or first body section 25, an end or second body section 27 and a jam nut 29. These body sections and the jam nut 29 may be constructed, for example, of a suitable metal or rigid plastic. The body sections 25 and 27 are releasably attached to the central body section 23 in any suitable manner, such as by screws 31.

The body 17 has an axial passage 33 extending therethrough which opens at its opposite ends in ports 35 and 37. Portions of the passage 33 extend through each of the body sections 23, 25 and 27. The body sections 25 and 27 have walls 39 which define enlarged regions 41 of the passage 33 in the respective body section. In addition, the central section 23 has a conical enlarged region 43 opening at the end which confronts the end section 25. An annular flange 45 reduces the cross-sectional area at the ports 35 and 37 so that the ports have a smaller cross-section than the enlarged regions 41.

The central section 23 has an annular flange 47 adapted to confront and engage the bulkhead 13. Annular O-ring seals 49 and 51 are carried by corresponding grooves in the flange 47 and in the surface of the central body section 23 which confronts the end body section 25.

Preferably, each of the end sections 25 and 27 includes a main segment 53 and an end segment 55 releasably attached thereto in any suitable manner, such as by screws 57. Annular O-ring seals 58 are carried by annular grooves in the main segments 53 to seal between the main segments 53 and the associated end segments 55. Each of the end segments 55 has external screw threads, and the main segment 53 of the end section 27 has external threads 59. As shown in FIG. 1, the enlarged regions 41 are defined by both of the associated main segments 53 and end segments 55.

The body 17 is mounted on the bulkhead 13 such that the end section 27 projects through an opening 61 in the bulkhead, and the central section 23 and the end section 25 are on the other side of the bulkhead. Specifically, the flange 47 and the jam nut 29 cooperate to clamp an annular region of the bulkhead 13 surrounding the opening 61 to thereby mount the body 17 on the bulkhead. For this purpose, the jam nut 29 is mounted on the end section 27 and cooperates with the threads 59. When so mounted, the seal 49 sealingly engages the bulkhead 13, and if desired, an annular ring of solder or epoxy 63 around the periphery of the flange 47 can be used to assure that a hermetic seal is provided between the bulkhead 13 and the central body section 23.

The graded index rod 19 is in the passage 33 and has opposite ends 65 in the enlarged regions 41, respectively. The graded index rod 19 is preferably metalized and held in a fixed position in the passage 33 by solder 69 in the enlarged region 43. The solder 69 also forms a hermetic seal between the rod 19 and the central body section 23.

Optically, the graded index rod receives an optical signal at one end and transfers the optical signal to the opposite end. The graded index rod 19 may receive a focused signal at one end and refocus the signal at the opposite end. For example, the graded index rod 19 may have a pitch length which is an even multiple of 0.5.

Figure 2:
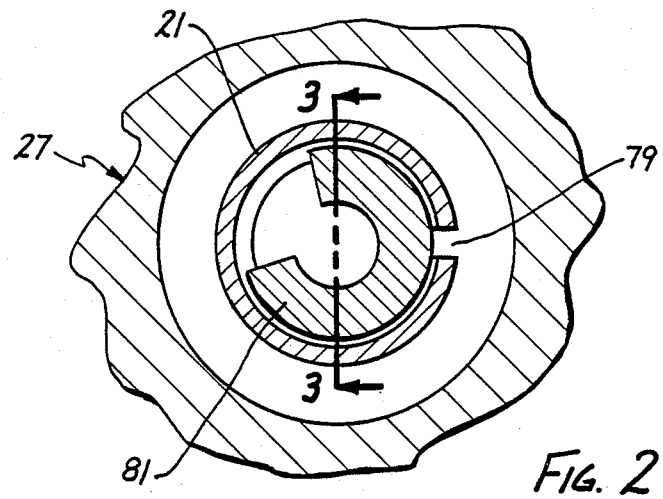
FIG. 2 is an enlarged, fragmentary sectional view taken generally along line 2—2 of FIG. 1.
Figure 3:
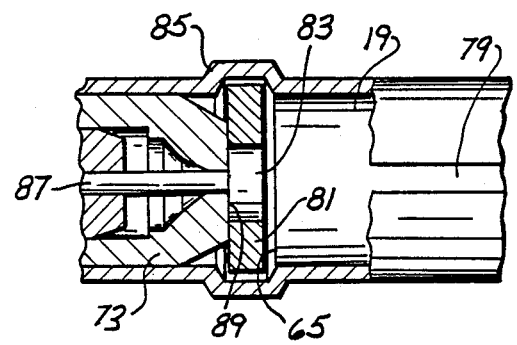
FIG. 3 is an enlarged, fragmentary sectional view illustrating the components adjacent the interface between the graded index rod and the fiber optic terminus.

The alignment sleeves 21, which are identical and slotted, are provided in the enlarged regions 41, respectively. Specifically, each of the alignment sleeves 21 receives, and resiliently grips, an end portion of the graded index rod 19 and has a bushing receiving section 71 which extends beyond, i.e., axially outwardly of the ends 65, respectively, of the rod to receive, and resiliently grip, an end portion of a bushing 73 of a fiber optic terminus 75 (only one fiber optic terminus is shown in FIG. 1). The alignment sleeves 21 are conventional and are spaced radially inwardly from the associated wall 39. The inner ends of the alignment sleeves 21 abut shoulders 77, respectively, at the inner ends of the enlarged regions 41, respectively, and the diameter of the ports 35 and 37 is too small to permit passage of the alignment sleeve 21 therethrough. Thus, the flanges 45 form means which prevent the associated alignment sleeve 21 from being moved out of the passage through the associated port in that they obstruct movement of the alignment sleeve out of the port. Each of the alignment sleeves 21 has an axial slot 79 (FIG. 2) so that it is resilient and can resiliently grip the graded index rod 19 and the bushing 73. In addition, a floating spacer 81 (FIG. 3), having an aperture 83, is loosely carried within an annular channel 85 formed in the alignment sleeve 21. As shown in FIG. 3, an optical fiber 87 extends through the bushing 73 and terminates flush with an end face 89 of the bushing 73. The spacer 81 separates the end face 89 from the end 65 of the graded index rod 19 and is allowed to float axially to accommodate various axial positions of the bushing 73. Floating spacers, such as the spacer 81, are commonly provided as part of an alignment sleeve.

The fiber optic terminus 75 forms a part of the fiber optic connector 15 and is a standard military specified-type of fiber optic terminus. As such, the terminus 75 is characterized, in part, by the bushing 73 and the fiber 87 which terminates flush with the end face 89 as shown in FIG. 3.

The fiber optic connector 15 also includes a housing 91 and a nut 93 mounted for rotation on the housing by a flange 95 and a retaining ring 97. With this construction, the nut 93 can be threaded onto the external threads of the end body section 27 to thereby mechanically couple the connector 15 to the feedthrough connector 11.

The terminus 75 is carried by the housing 91 in a well known manner by virtue of the cooperation between a retainer 99 of the terminus and an internal shoulder 101 of the housing. Accordingly, by threading the nut 93 onto the end body section 27, the bushing 73 can be slidably received within the bushing receiving section 71 of the alignment sleeve 21.

Although only one such fiber optic connector 15 is shown in FIG. 1, it is apparent that an identical fiber optic connector 15 can be similarly mounted on the end section 25. When so mounted, the graded index rod 19 can transmit an optical signal from one of the termini 75 to the other as described above. When the fiber optic connector 15 is removed from the feedthrough connector 11, the alignment sleeve 21 is not pulled off of the graded index rod 19 because the flange 45 prevents movement of the alignment sleeve out through the port 37.

To assemble the feedthrough connector 11, the graded index rod 19 is inserted into the passage 33 of the central body section to the desired location, and the solder or epoxy 69 is then applied to affix the rod 19 in position. Next, the main segments 53 of the end body sections 25 and 27 are attached to the central section 23 with the screws 31. In order to minimize shear problems, the graded index rod 19 fits relatively tightly in the portion of the passage 33 which is in the central section 23 and fits relatively loosely in the portions of the passage 33 which are in the end body sections 25 and 27. The alignment sleeves 21 are then slipped over the opposite end portions of the graded index rod 19, and the end segments 55 are attached using the screws 57. With the assembly thus completed, it can be mounted on the bulkhead with the jam nut 29 and used as described above in association with standard military specified fiber optic connectors 15 as described above.

Although an exemplary embodiment of the invention has been shown and described, many changes, modifications and substitutions may be made by one having ordinary skill in the art without necessarily departing from the spirit and scope of this invention.

What is claimed is:

1. A feedthrough connector comprising:
   a connector body including first and second body sections, a central body section between the first and second body sections, first means for releasably attaching the first body section to the central body section and second means for releasably attaching the second body section to the central body section, said body sections having a passage extending therethrough with a portion of said passage being in each of said body sections;
   a graded index rod in said passage and having first and second ends in the portions of the passage which are in the first and second body sections, respectively; and
   a first alignment sleeve in the portion of the passage which is in the first body section, said first alignment sleeve receiving a portion of said graded index rod and having means extending beyond said first end of said graded index rod for receiving an end portion of a fiber optic terminus.

2. A feedthrough connector as defined in claim 1 including a second alignment sleeve in the portion of the passage which is in the second body section, said second alignment sleeve receiving a portion of said graded index rod and having means extending beyond said second end of said graded index rod for receiving an end portion of another fiber optic terminus.

3. A feedthrough connector as defined in claim 2 wherein said second body section includes an end segment and a main segment and means for releasably attaching the end segment to the main segment, a portion of the second alignment sleeve being in the end segment.

4. A feedthrough connector as defined in claim 1 wherein the first body section has a wall defining an enlarged region of the passage in the first body section and said first alignment sleeve is in said region of said first body section and spaced radially inwardly of said wall over at least some of the length of the first alignment sleeve.

5. A feedthrough connector as defined in claim 4 wherein said passage opens at a port in the first body section and the feedthrough connector includes means for preventing the first alignment sleeve from being moved out of the passage through said port.

6. A feedthrough connector as defined in claim 5 wherein said preventing means includes a flange which obstructs movement of the first alignment sleeve out of the passage through said port.

7. A feedthrough connector as defined in claim 1 including means for sealing between the graded index rod and the central body section.

8. A feedthrough connector as defined in claim 1 including external threads on the second body member and a nut cooperable with said threads.

9. An assembly comprising:
   a bulkhead having an opening extending therethrough;
   a connector body including first and second body sections and a central body section between the first and second body sections, said central body section and said first body section being on one side of the bulkhead and said second body section extending through said opening to the other side of the bulkhead;
   means for attaching said connector body to said bulkhead;
   means for releasably attaching the first body section to the central body section and means for releasably attaching the second body section to the central body section;
   said body sections having a passage extending therethrough with a portion of said passage being in each of said body sections;
   a graded index rod in said passage and having first and second ends in the portions of the passage which are in the first and second body sections, respectively;
   a first alignment sleeve in the portion of the passage which is in the first body section, said first alignment sleeve receiving a portion of said graded index rod and having means extending beyond said first end of said graded index rod for receiving an end portion of a fiber optic terminus;
   sealing means for sealing between the bulkhead and the central body section; and
   sealing means for sealing between the central body section and the graded index rod and between the central body section and the first body section.

10. An assembly as defined in claim 9 wherein the means for attaching the connector body to the bulkhead includes a flange on the central body section and a jam nut on the second body section.

* * * * *